(12) United States Patent
Toshiharu

(10) Patent No.: US 6,753,848 B2
(45) Date of Patent: Jun. 22, 2004

(54) POINTING DEVICE

(75) Inventor: Miyoshi Toshiharu, Higashiosaka (JP)

(73) Assignee: Hosiden Corporation, Yao (JP)

(*) Notice: Subject to any disclaimer, the term of this patent is extended or adjusted under 35 U.S.C. 154(b) by 181 days.

(21) Appl. No.: 10/026,449

(22) Filed: Dec. 27, 2001

(65) Prior Publication Data

US 2002/0084979 A1 Jul. 4, 2002

(30) Foreign Application Priority Data

Dec. 28, 2000 (JP) .................................. 2000-401481

(51) Int. Cl.[7] .............................................. G09G 5/08
(52) U.S. Cl. ..................................... 345/157; 345/163
(58) Field of Search ................................ 345/156, 157, 345/159, 160, 161, 163, 158, 164, 167, 168, 169, 145, 166, 184, 146, 165; 200/6 A; 463/37, 38, 39; 250/236

(56) References Cited

U.S. PATENT DOCUMENTS

| | | | | |
|---|---|---|---|---|
| 5,019,677 A | * | 5/1991 | Menen .......................... 345/174 |
| 5,293,158 A | * | 3/1994 | Soma ........................... 345/161 |
| 5,790,098 A | * | 8/1998 | Lin .............................. 345/163 |
| 6,188,389 B1 | * | 2/2001 | Yen ............................. 345/163 |
| 6,323,844 B1 | * | 11/2001 | Yeh et al. .................... 345/166 |
| 6,445,379 B1 | * | 9/2002 | Liu et al. ..................... 345/163 |

* cited by examiner

*Primary Examiner*—Bipin Shalwala
*Assistant Examiner*—Mansour M. Said
(74) *Attorney, Agent, or Firm*—Armstrong, Kratz, Quintos, Hanson & Brooks, LLP

(57) ABSTRACT

The present invention provides a pointing device inputting a signal in an X-Y direction on the basis of a sliding operation which is easily mounted to an external substrate without using a connector. A case is constituted by an upper case made of a metal plate, and a lower case made of a resin. An internal substrate is arranged below one set of moving bodies linearly moving in the X-Y direction in correspondence with the sliding operation of the operating body, and the internal substrate is insert molded in a bottom plate portion of the lower case made of the resin. One end portion of a terminal member is brought into contact with the internal substrate and is insert molded in the bottom plate portion of the lower case together with the internal substrate. Another end portion of the terminal member is protruded out of the lower case so as to form a connection terminal with the external substrate.

6 Claims, 5 Drawing Sheets

[Fig.1]
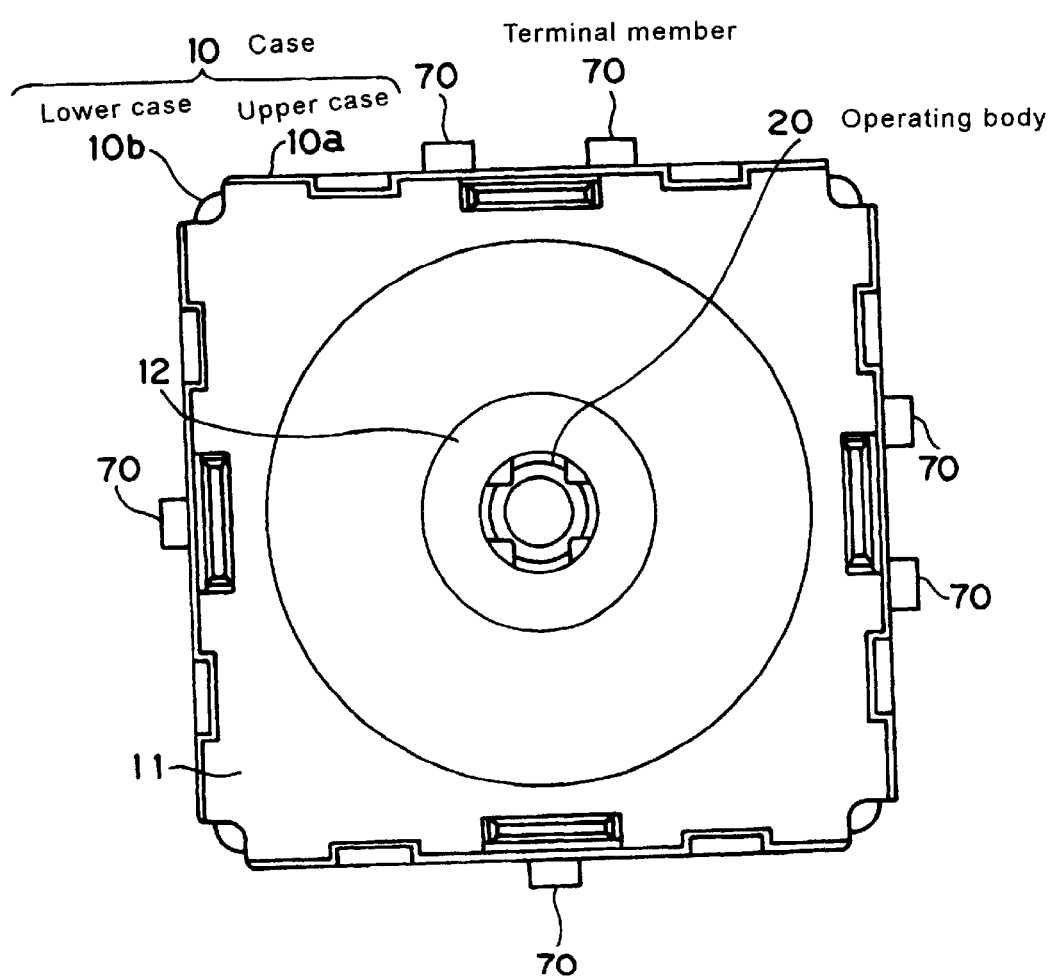

[Fig.2]
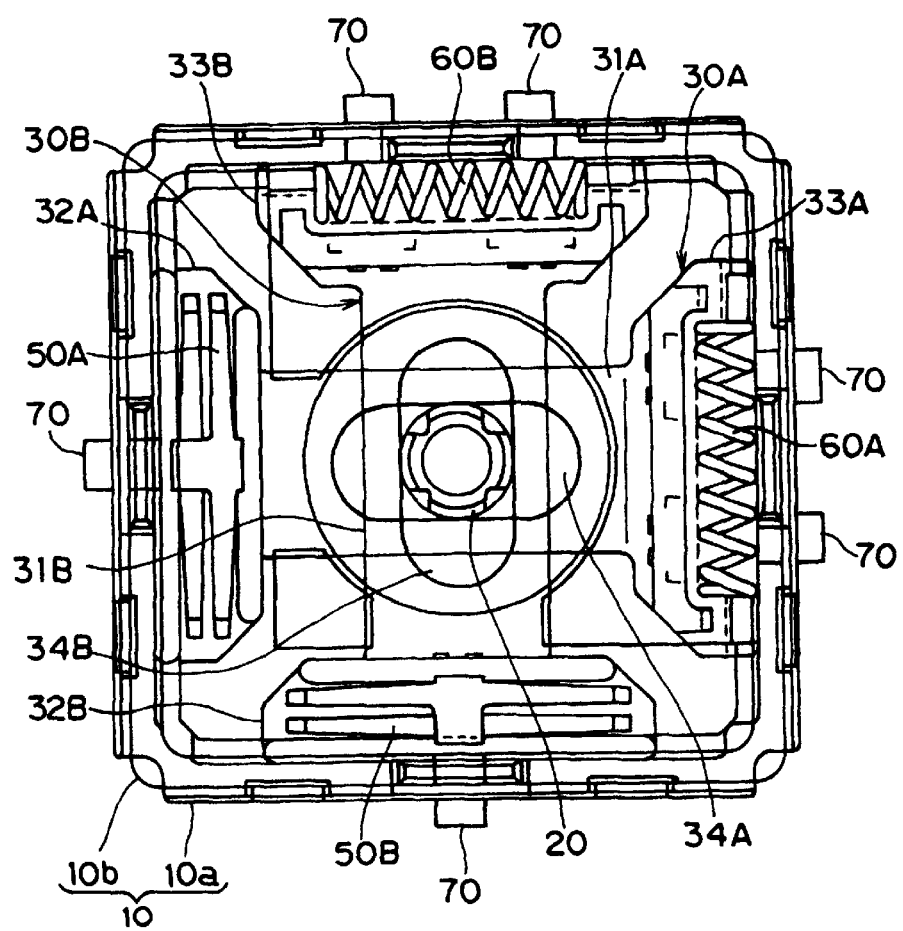

[Fig.3]
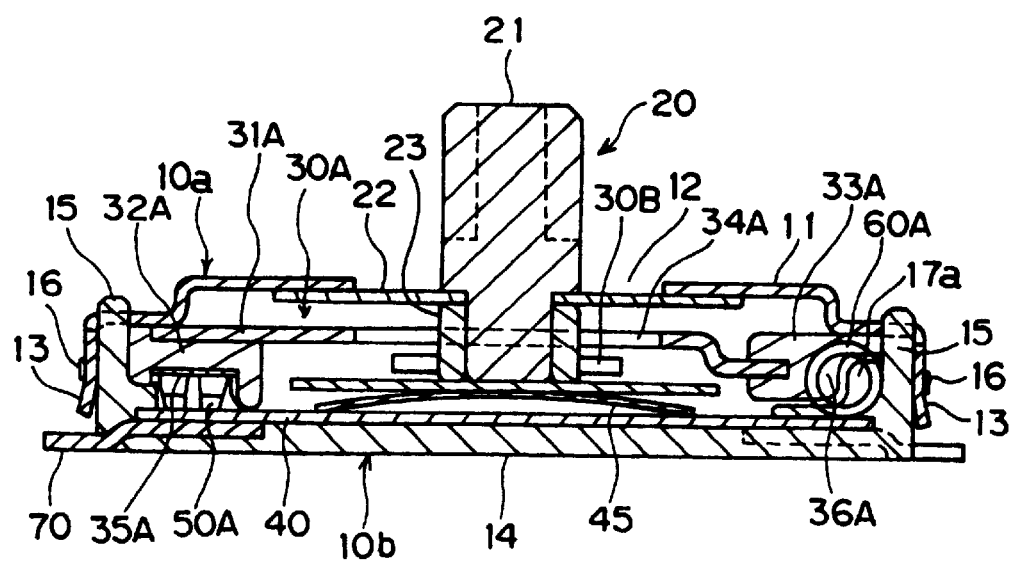

[Fig.4]
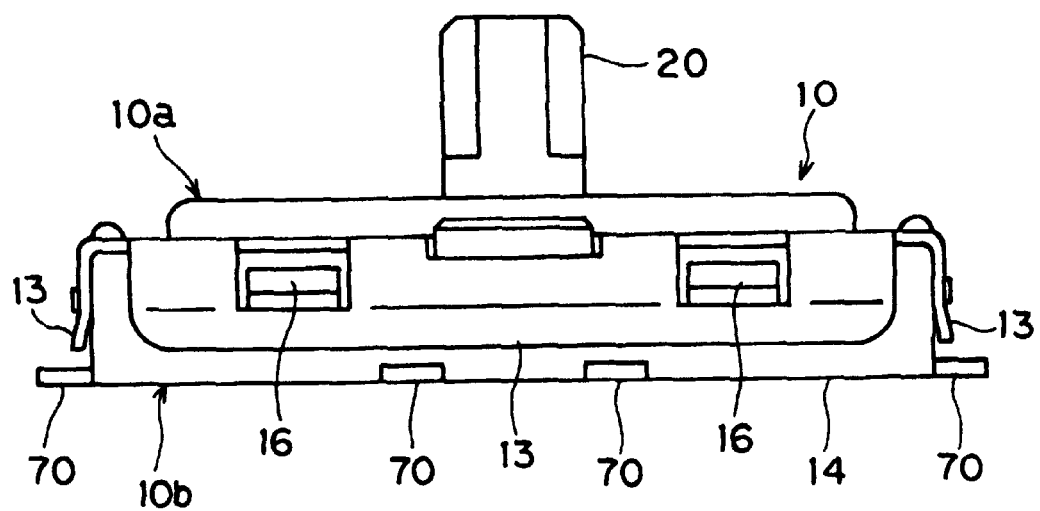

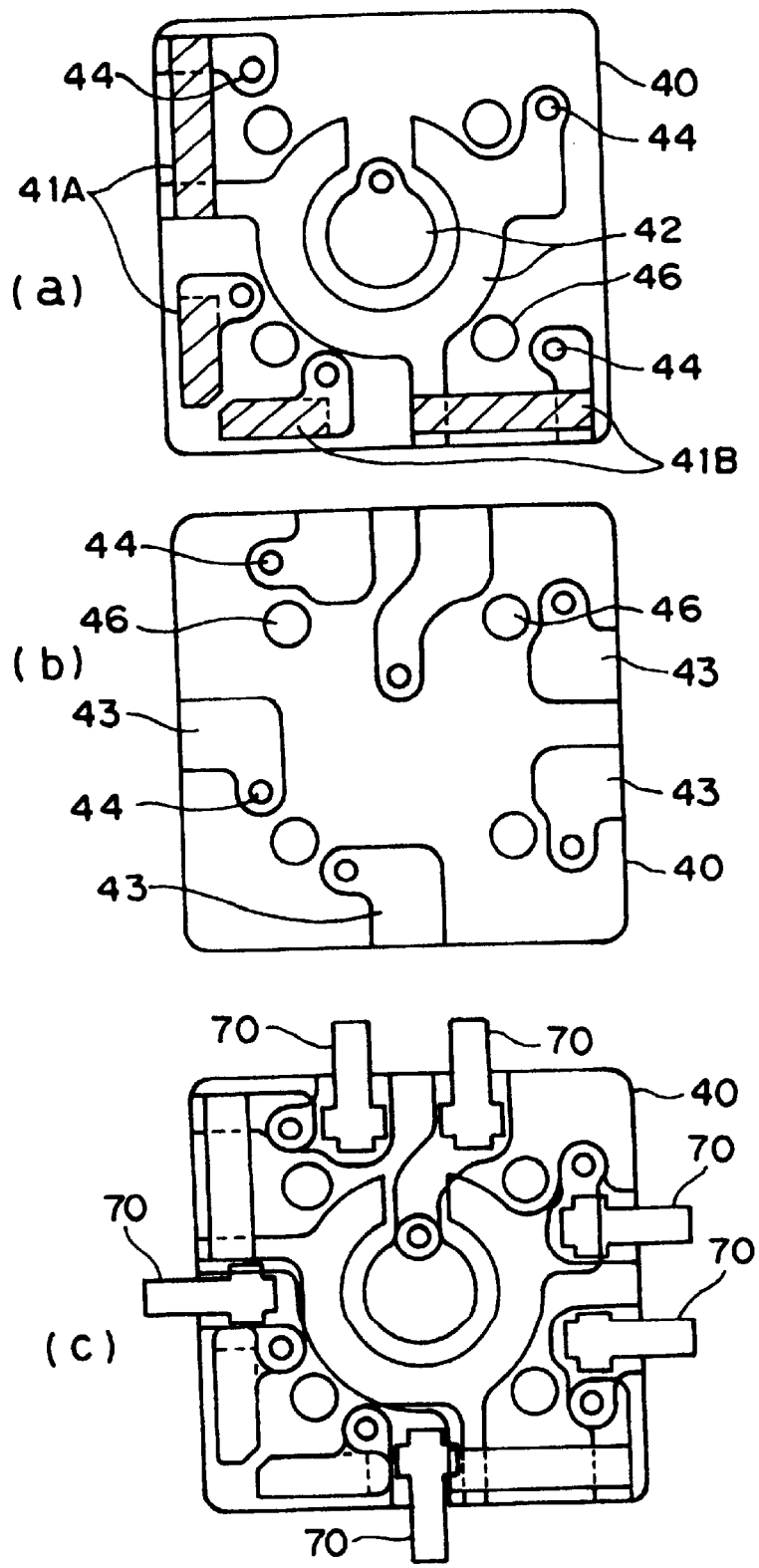
[Fig.5]

POINTING DEVICE

BACKGROUND OF THE INVENTION

1. Field of the Invention

The present invention relates to a pointing device used for inputting a signal in an X-Y direction in various kinds of electronic equipment such as a remote controller, a game machine, a cellular phone and the like, and more particularly to a slide operation type pointing device for slide operating an operating body along a plate surface of an external mounting substrate.

2. Prior Art

There is a slide operation type pointing device as a device for inputting a signal in an X-Y direction. This pointing device is generally provided with a case fixed to an external mounting substrate, a sliding type operating body attached to said case for inputting a signal in an X-Y direction and slid in all the peripheral directions along a front surface of the mounting substrate, a pair of moving bodies linearly moving in an X direction and a Y direction within the case together with the slide operation of the operating body, and an internal substrate positioned below a pair of moving bodies and provided within the case.

The internal substrate is generally constituted by a flexible substrate, and has a pair of resistance circuits with which contact terminals mounted to a pair of moving bodies are slidably in contact. A pair of resistance circuits constitute a pair of volumes together with a pair of contact terminals, and output an electric signal corresponding to a moving position of a pair of moving bodies in the X-Y direction.

In the pointing device mentioned above, it is necessary to supply a power supply source voltage for the volumes from an external circuit. Further, it is necessary to apply an electric signal in the X-Y direction to the external circuit. Accordingly, the internal substrate is electrically connected to the external mounting substrate. Further, as one of connecting aspects thereof, there has been executed a method of drawing a terminal portion in the internal substrate out of the case and inserting it to a connector mounted to the external mounting substrate.

In accordance with the aspect of connecting the internal substrate to the external substrate, the internal substrate is securely connected to the external substrate via the connector. However, in an assembly of an equipment using the pointing device, in addition to an operating of mounting the pointing device to the external substrate, there are required a soldering operation for mounting the connector on the external substrate and an inserting operation for inserting the terminal portion of the internal substrate to the connector, and these two excessive operations cause an assembling operability of the equipment.

Further, there are problems such as an increase of mounting area and an increase of parts cost due to a use of the connector.

SUMMARY OF THE INVENTION

The present invention is made by taking the matters mentioned above into consideration, and an object of the present invention is to provide a pointing device which can securely connect an internal substrate to an external substrate in accordance with a simple operation and can reduce a mounting area and a parts cost.

In order to achieve the object mentioned above, in accordance with the present invention, there is provided a pointing device comprising:

a case in which at least a bottom plate portion thereof is made of a plastics material or resin, the bottom plate portion being mountable on an external substrate;

a sliding type operating body attached to the case for inputting a signal in an X-Y direction and slideable in all directions along a front surface of the case;

a pair of moving bodies linearly moving in an X direction and a Y direction within the case in response to the sliding operation of the operating body;

an internal substrate provided within the case positioned below a pair of moving bodies and insert molded in the bottom plate portion of the case; and a terminal member having one end portion electrically connected to the internal substrate, the one end portion being insert molded in the bottom plate portion of the case together with the internal substrate, and another end portion protruding from the case to form a connecting terminal for connecting with an external substrate.

In the pointing device in accordance with the present invention, if the terminal member protruding out of the case is connected to the external substrate, that is, if the pointing device is mounted on the external substrate, the internal substrate is electrically connected to the external substrate. Accordingly, none of an operation of mounting the connector on the external substrate and an operation of inserting the internal substrate to the connector are required, and the connector itself is not required. Further, since the internal substrate and the terminal member are insert molded in the bottom plate portion of the case, it is easy to assemble them in the case and it is possible to intend to make the device thin.

In the case that the case is constituted by a two-piece structure in which an upper case made of a metal plate and a lower case made of a resin are assembled, and the internal substrate and the terminal member are insert molded in a bottom plate portion of the case, a height of the apparatus is further restricted.

In the case that the moving body is constituted by a plate-like metal portion extending in a direction perpendicular to a moving direction, and a resin portion corresponding to a pair of sliders mounted to both end portions of the metal portion and holding the metal portion in such a manner as to move within the case, a height of the device can be further restricted.

Further, in the case that one resin portion or slider provided in the moving body also serves as a holding member of a contact terminal being slidably in contact with a front surface of the internal substrate, and another resin portion or slider also serves as a holding member of a zero return spring, that is, the contact terminal and the return spring are arranged so as to be divided into both sides, it is possible to design the case in a symmetrical shape with respect to a center of the operating body, and it is easy to design a symmetrical equipment.

BRIEF DESCRIPTION OF THE DRAWINGS

FIG. 1 is a plan view of a pointing device in accordance with an embodiment of the present invention.

FIG. 2 is a perspective plan view of the pointing device.

FIG. 3 is a vertical cross sectional front elevational view of the pointing device.

FIG. 4 is a side elevational view of the pointing device.

FIG. 5 is a wiring pattern of an internal substrate used in the pointing apparatus.

DESCRIPTION OF REFERENCE NUMERALS

10 CASE
10a UPPER CASE
10b LOWER CASE
11 TOP PLATE PORTION
14 BOTTOM PLATE
20 OPERATING BODY
30A, 30B MOVING BODY
31A, 31B METAL PORTION
32A, 32B, 33A, 33B RESIN PORTION (SLIDER)
34A, 34B OPENING PORTION
40 INTERNAL SUBSTRATE
41A, 41B RESISTANCE CIRCUIT
42 SWITCH CIRCUIT
43 CONTACT PORTION
44 THROUGH HOLE
45 ELASTIC CONTACT PIECE
50A, 50B CONTACT TERMINAL
60A, 60B SPRING
70 TERMINAL MEMBER

Embodiment

A description will be given of an embodiment in accordance with the present invention with reference to the accompanying drawings. FIG. 1 is a is a plan view of a pointing device in accordance with an embodiment of the present invention, FIG. 2 is a perspective plan view of the pointing device, FIG. 3 is a vertical cross sectional front elevational view of the pointing device, FIG. 4 is a side elevational view of the pointing device, and FIG. 5 is a wiring pattern of an internal substrate used in the pointing apparatus.

A pointing device in accordance with the embodiment of the present invention is provided, as shown in FIGS. 1 to 4, with a case 10 fixed onto an external mounting substrate, a sliding type operating body 20 attached to the case 10 for the purpose of inputting a signal in an X-Y direction, a pair of upper and lower moving bodies 30A and 30B linearly moving in the X-Y direction within the case 10 together with the sliding operation of the operating body 20, an internal substrate 40 received within the case 10 for the purpose of constituting a volume portion in the X-Y direction and a push-down switch in a Z direction perpendicular to the X-Y direction, a pair of contact terminals 50A and 50B mounted to the moving bodies 30A and 30B for the purpose of constituting the volume portion in the X-Y direction, a pair of return springs 60A and 60B held by the moving bodies 30A and 30B, and a plurality of terminal members 70, 70, held in the case 10 for the purpose of connecting the internal substrate 40 to the external mounting substrate.

In this case, the volume portion in the X-Y direction is formed in two line portions perpendicular to each other of the case 10. Further, the moving body 40A and the contact terminal in an upper stage input a signal in a Y direction and the moving body 40B and the contact terminal 50B in a lower stage input a signal in an X direction.

The case 10 is constituted by a two-piece structure obtained by combining a lower case 10b forming a bottom plate portion with an upper case 10a forming a top plate portion.

The upper case 10a corresponds to a cover constituted by a metal plate, and a circular opening portion 12 is provided in a substantially quadratic top plate portion 11 thereof so as to be positioned at a center portion for the purpose of protruding a part of the operating body 20 upward. Fixing portions 13 formed by perpendicularly bending respective edge portions downward are provided in four line portions of the top plate portion 11. The fixing portions 13 are engaged with hook portions provided on an outer surface of a side wall portion of the lower case 10b mentioned below, thereby fixing the upper case 10a to the lower case 10b.

The lower case 10b corresponds to a flat and shallow box (rectangular container) constituted by a substantially quadratic bottom plate portion 14 and four side wall portions 15 standing upward from four line portions of the bottom plate portion 14, and is made of a resin. Hook portions 16 with which the fixing portions 13 of the upper case 10a are engaged are provided on outer surfaces of the respective side wall portion 15.

The operating body 20 has a shaft portion 21 formed in a substantially perpendicular round rod shape with respect to the bottom plate portion 14 of the lower case 10b, a come-off preventing member 22 mounted to the shaft portion 21, and a fixing member 23 fixing the come-off preventing member 22. A substantially upper half portion of the shaft portion 21 protrudes out to an upper portion of the top plate portion 11 through the opening portion 12 provided in the top plate portion 11 of the upper case 10a, and a disc-like operating portion (not shown) is mounted to the protruding portion. That is, the operating body 20 employs a separate structure in which the operating portion is constituted by separate pieces.

A substantially lower half portion of the shaft portion 21 is inserted into the case 10. The come-off preventing member 22 corresponds to a metal plate attached to the inserting portion, and prevents the operating body 20 from coming off upward while allowing the operating body 20 to move in a Z direction. The fixing member 23 corresponds to a ring fitted to a lower portion of the shaft portion 22, fixed the come-off preventing member 22 between the fixing member 23 and the upper half portion of the shaft portion 21, and forms a driving portion for driving the moving bodies 30A and 30B together with the lower portion of the shaft portion 22.

Among a pair of upper and lower moving bodies 30A and 30B, the moving body 30A inputs a signal in the Y direction and can move only in the Y direction. The moving body 30B in the lower stage inputs a signal in the X direction and can move only in X direction. Both of the elements are combined perpendicularly, however, individual substantial structures are the same. A description will be given of the structure with respect to the moving body 30A in the upper stage shown in FIG. 3 in detail, with reference to FIG. 2.

The moving body 30A in the upper stage is constituted by a metal portion 31A made of a metal plate, and a pair of resin portions 32A and 33A mounted to both ends of the metal portion 31A. The metal portion 31A is formed in a substantially flat plate shape extending in the X direction perpendicular to the moving direction (Y direction). A quadrangular long hole 34A through which the shaft portion 21 of the operating body 20 extends is provided in the metal portion 31A. The long hole 34A extends long in the X direction for the purpose of allowing a relative movement in the X direction of the operating body 20. The metal portion 31A is insert molded in the resin portions 32A and 33A in both end sides, thereby being connected to the resin portions 32A and 33A.

A pair of resin portions 32A and 33A corresponds to sliders movably holding the metal portion 31A within the case 10, and slides in the Y direction along parallel two line portions between the upper case 10a and the lower case 10b in the case 10, more securely, on the internal substrate 40 arranged on the bottom plate portion 14 of the lower case 10b. One resin portion 32A also serves as a structure member of a volume and another resin portion 33A also serves as a structure member of a zero return mechanism.

That is, a first receiving portion 35A for receiving a contact terminal 50A is provided in a lower surface of one resin portion 32A. The contact terminal 50A downward mounted within this receiving portion 35A is elastically in contact with a front surface of the lower internal substrate 40. Further, a second receiving portion 36A receiving a spring 60A in a compression state is provided in another resin portion 33A. The spring 60A received within the second receiving portion 36A is structured such as to be held by a pair of arresting portions 17A provided in the lower case 10b so as to be positioned at both end sides thereof, from both end sides.

In this case, since the moving body 30B in the lower stage has substantially the same structure as that of the moving body 30A in the upper stage except a point of being arranged so as to be perpendicular to the moving body 30A in the upper stage mentioned above, the same reference numerals (in this case, suffixes are B) are attached to the corresponding portions, and a description thereof will be omitted.

The internal substrate 40 is made of the same resin as that of the lower case 10b, and is insert molded in a side of a front surface of the bottom plate portion 14 of the lower case 10b, thereby being fixed to the bottom plate portion 14. Two sets of resistance circuits 41A and 41B constituting a volume circuit are formed on the front surface of the internal substrate along perpendicular two line portions, as shown in FIG. 5(a). Further, one set of switch circuits 42 constituting a push-down switch are annularly formed in a center portion of the front surface, and a dome-like elastic contact piece 45 called as a snap plate is fixed thereto by a tape.

One set of contact terminals 50A and 50B are elastically in contact with two sets of resistance circuits 41A and 41B from the above. The elastic contact piece 45 urges the operating body 20 upward and deforms downward, thereby short circuiting the lower switch circuit 42.

On the contrary, on a back surface of the internal substrate 40, as shown in FIGS. 5B and 5C, a plurality of contact portions 43 with which the terminal members 70 are in contact are formed so as to be positioned near a side edge portion. A plurality of contact portions 43 correspond to resistance circuits 41A and 41B and a switch circuit 42 on the front surface side, and are electrically connected to the corresponding circuits via through holes 44.

In this case, all of FIGS. 5A to 5C are plan views, in which FIG. 5A shows a wiring pattern in a front surface side and FIG. 5B shows a wiring pattern in a back surface side in a perspective manner. Further, FIG. 5C corresponds to a view obtained by combining FIGS. 5A and 5B. In the respective drawings, reference numeral 46 denotes an opening portion for positioning provided in the internal substrate 40.

A plurality of terminal members 70 are constituted by small strip-like metal thin plates, and protrude outward from four line portions of the lower case 10b. Each of the terminal members 70 is structured such that one end portion is held between the bottom plate portion 14 of the lower case 10b and the internal substrate 40 thereabove, and is insert molded in the lower case 10b together with the internal substrate 40 in a state of being in contact with the corresponding contact portion 43 formed on the back surface of the internal substrate 40.

Another end portion of each of the terminal members 70 horizontally protrudes out of the lower case 10b so as to form a connection terminal with the external mounting substrate, and is positioned within substantially the same plane as the bottom surface of the lower case 10b in such a manner as to be in contact with the front surface of the mounting substrate at a time of mounting the lower case 10b on the mounting substrate.

Next, a description will be given of a using method and a function of the pointing device in accordance with the embodiment of the present invention.

The pointing device is mounted on the external mounting substrate, and another end portion of each of a plurality of terminal members 70 is connected to the wiring pattern formed on the front surface of the mounting substrate in accordance with a soldering. Accordingly, the case 10 is mechanically fixed onto the mounting substrate, and the internal substrate 40 within the case 10 is electrically connected to the external mounting substrate via a plurality of terminal members 70.

That is, in the case of the pointing device in accordance with the embodiment of the present invention, it is possible to electrically connect the internal substrate 40 with the external mounting substrate only on the basis of a simple operation of mounting the case 10 onto the mounting substrate without performing an operation of inserting the terminal portion of the internal substrate 40 to the connector on the mounting substrate and a soldering operation of mounting the connector onto the mounting substrate. Accordingly, it is possible to simplify an assembling operation of an equipment using the pointing device.

Further, since the connector is more expensive than the terminal member 70, a parts cost is reduced due to an omission of the connector, and further a mounting area is reduced.

In the pointing device mounted on the mounting substrate, when no external force in the X-Y direction is applied to the operating body 20, the moving bodies 30A and 30B are elastically held at an original position by the springs 60A and 60B. As a result, the operating body 20 is also elastically held at the original position. Further, due to an energizing force applied by the elastic contact piece 42, the operating body 20 is elastically held at an upper limit position (a position at which the come-off preventing member 22 is brought into contact with the top plate portion 11 of the upper case 10a from the below).

When operating the operating body 20 in the X direction, the moving body 30B in the lower stage moves in the X direction. In correspondence therewith, the contact terminal 50B slides on the corresponding resistance circuit 41B on the internal base plate 40. As a result, an electric signal corresponding to a moving amount in the X direction is output so as to be input to an electronic equipment using the device. Further, in correspondence to the movement of the moving body 30B, the spring 60B received within the second receiving portion 36B is going to move in an axial direction, however, since the movement is restricted by one of the arresting portions 17A and 17B provided in the lower case 10b, the spring 60B is pressed in the axial direction so as to be compressed. Accordingly, when taking out the external force applied to the operating body 20, the moving body 30B automatically returns to the original position, whereby the operating body 20 automatically returns to the original position.

When operating the operating body 20 in the Y direction, the moving body 30A in the upper stage moves in the Y direction. In correspondence thereto, the contact terminal 50A slides on the corresponding resistance circuit 41A on the internal substrate 40. As a result, an electric signal corresponding to a moving amount is output so as to be input to an electronic equipment using the device. Further, in correspondence to the movement of the moving body 30A, the spring 60A moves in the axial direction, however, since the movement is restricted by one of the arresting portions 17A and 17B provided in the lower case 10b, the spring 60A is pressed in the axial direction so as to be compressed. Accordingly, when taking out the external force applied to the operating body 20, the moving body 30A automatically returns to the original position, whereby the operating body 20 automatically returns to the original position.

On the basis of a combination of these operations, the electric signal in correspondence to the moving direction and the moving amount in the X-Y direction of the operating body 20 is input to the equipment using the pointing device.

Further, when pressing the operating body 20 downward against the energizing force applied by the elastic contact piece 45, the elastic contact piece 45 deforms so as to short circuit the switch circuit 42 formed on the upper surface of the internal substrate 40 disposed below. Accordingly, it is possible to obtain a function forming a push-down switch.

A volume portion corresponding to a signal outputting means is built in the two perpendicular line portions of the case 10. Accordingly, in comparison with the case of using an external volume, a number of the parts can be reduced. Further, since the internal substrate 40 is used in both of the volume portion and the push-down switch, the number of the parts can be reduced also in this view.

With respect to the moving bodies 30A and 30B, resin portions 22A and 22B in one side also serve as constituting members for the slider and the volume portion, and resin portions 23A and 23B in another side also serve as constituting members for the slider and the zero return mechanism. That is, the contact terminals 50A and 50B constituting the volume and the spring, 60A and 60B for returning to the original point are arranged so as to be divided into both end sides of the metal portions 51A and 51B. Accordingly, the case 10 is formed in a symmetrical substantially quadratic shape with respect to the center of the operating body 20 in spite of the structure in which the volume is built in two perpendicular line portions.

Further, in spite that the volume portion is received within the case 10 together with the internal substrate 40, and the push-down switch is built in, the moving bodies 30A and 30B use the plate-like metal portions 32A and 32B and the upper case 10a is constituted by the metal plate, so that a height of the device can be restricted to be low.

That is, the pointing device in accordance with the embodiment of the present invention is of a thin type in spite of having a multi-function.

Further, since the operating body 20 is formed in a separate structure in which the operating portion is constituted by an independent piece, there is an advantage that the shape of the operating portion can be simply modified. In this case, it goes without saying that it is possible to use the operating body 20 in which the operating portion is integrally formed.

Effect of the Invention

As mentioned above, since the pointing device in accordance with the present invention is structured such that at least the bottom plate portion of the case is made of the resin, and the internal substrate and the terminal member are insert molded here, it is possible to connect the internal substrate within the case to the external substrate only by mounting the case onto the external substrate. Accordingly, the operation of inserting the terminal portion of the internal substrate to the connector on the external substrate, and the soldering operation of mounting the connector onto the external substrate are not required, whereby it is possible to significantly simplify the operation of connecting the internal substrate to the external substrate. Accordingly, it is possible to simplify the assembling operation of the equipment using the pointing device. Further, since the connector is not required, it is possible to reduce the mounting area and it is possible to reduce the parts cost.

FIG. 1

① CASE
② LOWER CASE
③ UPPER CASE
④ TERMINAL MEMBER
⑤ OPERATING BODY

What is claimed is:

1. A pointing device comprising:
    a case in which at least a bottom plate portion thereof is made of a plastic material, said bottom plate portion being mountable on an external substrate;
    a sliding type operating body attached to said case for inputting a signal in an X-Y direction and slidable in all directions along a front surface of said case;
    a pair of moving bodies linearly moving in an X-direction and a Y direction within said case in response to the sliding operation of the operating body;
    an internal substrate provided within said case positioned below a pair of moving bodies and insert molded in the bottom plate portion of the case; and
    a terminal member having one end portion electrically connected to said internal substrate said one end portion being insert molded in the bottom plate portion of said case together with said internal substrate, and another end portion protruding from the case to form a connecting terminal for connecting with an external substrate, wherein said moving body has a plate-like portion extending in a direction perpendicular to a moving direction, and a sliders means mounted to both end portions of said plate-like portion and holding said plate-like portion in such a manner as to be moveable within said case.

2. The pointing device as claimed in claim 1, wherein said case is constituted by a two-piece structure in which an upper case and a lower case are assembled, and said internal substrate and the terminal member are inserted molded in a bottom plate portion of said lower case.

3. A pointing device as claimed in claim 2 wherein the upper case and the lower case are assembled together by snap-fitting.

4. A pointing device as claimed in claim 2 or 3 wherein the upper case is metal and the lower case is formed of a plastics material.

5. A pointing device as claimed in claim 1 wherein the plate-like portion of each moving body is metal and the slider means are formed of plastics material.

6. A pointing device as claimed in claim 1, wherein one of the slider means also serve as a holding member of a contact terminal being slidably in contact with a front surface of said internal substrate, and the other slider means also serves as a holding member of a return spring.

* * * * *